United States Patent Office 3,684,433
Patented Aug. 15, 1972

3,684,433
PRODUCTION OF VANADIUM OXYTRICHLORIDE
Ferdinand Langenhoff, Ranzel, Erich Termin, Laufenburg, Otto Bleh, Bergheim, Sieg, and Arnold Lenz, Cologne-Stammheim, Germany, assignors to Dynamit Nobel AG, Troisdorf, Postfach, Germany
No Drawing. Filed July 22, 1970, Ser. No. 57,359
Claims priority, application Germany, July 21, 1969,
P 19 36 988.1
Int. Cl. C22b 59/00
U.S. Cl. 423—472
7 Claims

ABSTRACT OF THE DISCLOSURE

In the production of vanadium oxytrichloride wherein vanadium pentoxide, carbon and chlorine are reacted, the improvement which comprises effecting the reaction by contacting a mixture of fine-grained vanadium pentoxide and carbon in the form of a gas permeable layer about 0.5 to 20 cm. high with chlorine at a temperature of about 350 to 750° C. Preferably the process is carried out continuously and the reaction temperature is maintained and controlled by regulating the rate of addition of the reactants. The resulting vanadium oxytrichloride is volatilized at a temperature of about 150° C. and is thereafter condensed.

---

The present invention relates to the production of vanadium oxytrichloride from vanadium pentoxide, carbon and chlorine. From German Patent (DAS) 1,283,210 it is known that vanadium oxytrichloride can be prepared by treating $V_2O_5$, dissolved or suspended in $VOCl_3$, with thionyl chloride, phosgene or disulfur dichloride [$S_2Cl_2$- sulfur monochloride]. It is to be noted that in comparison to chlorine, thionyl chloride is a relatively expensive chlorinating agent. Also the presence of $SO_2$ traces in the product can be detrimental to its use as a catalyst, since sulfur compounds are often catalyst poisons. It is also known from experiments with disulfur dichloride, that small quantities of sulfur remain in the product. The employment of phosgene demands special safety precautions because of its toxicity.

Furthermore, it is known from Inorganic Syntheses, New York, vol. 4, p. 80 (1953), that vanadium pentoxide is reduced to vanadium trioxide by hydrogen or carbon at temperatures between 600 and 1000° C. The trioxide is, in turn, reacted with elemental chorine at 500–600° C. to form vanadium oxytrichloride. Vanadium tetrachloride is also formed in this method, adding another expensive rectification stage to the two stage production of the raw product. This is complicated because partial decomposition of $VCl_4$ to $VCl_3$ and chlorine occurs during the rectification. $VCl_3$, a solid substance, is contaminated in the rectification column which results in additional disturbance. It is also distilled in the presence of sodium which is dangerous, since sodium can cause a spontaneous explosive reduction of the vanadium chlorides.

A further process for preparation of $VOCl_3$ is described in the Jour. Am. Chem. Soc. 80, 3483–84 (1958), which is based on the fact that vanadium pentoxide reacts with aromatic trichloromethyl compounds at high temperatures. Aside from the fact that the aromatic trichloromethyl compounds represent particularly expensive chlorinating agents, two higher boiling reaction products are simultaneously produced, so that it is usually impossible to prevent mutual trace contamination in the separation process. With $VOCl_3$, the greatest value is placed on the purity of the product because the product is mostly used as a catalyst, e.g., in the preparation of ethylene-propylene rubber.

All the above processes have been developed because the known laboratory scale reaction $$V_2O_5 + 3C + 3Cl_2 \rightarrow 2VOCl_3 + 3CO$$

was not heretofore capable of application to commercial operation. The reaction is strongly exothermic and therefore easily reaches temperatures which cause the reaction mass to melt or to sinter. Moreover, at excessively high temperatures reduction continues to the undesired vanadium tetrachloride. When the reaction stops and the temperature is thereby lowered, the recrystallization range is quickly reached. As a consequence, lumps and voids are formed by which the reaction capability of the mass is considerably reduced, in that the added chlorine no longer reacts uniformly with the reaction mass but escapes from the reaction through the cavities and channels formed. This leads in the end to the stopping of the reaction.

It is accordingly an object of the invention to provide a relatively inexpensive, safe process for converting vanadium pentoxide to vanadium oxytrichloride.

Another object of the invention is to find a way of utilizing on a commercial scale the known reaction of vanadium pentoxide with chlorine and carbon to give vanadium oxytrichloride.

These and other objects and advantages are realized in accordance with the present invention wherein an intimate mixture of fine-grained, low-ash carbon and fine-grained vanadium pentoxide in the form of a 0.5 to 20 cm. gas permeable layer in a vertical tubular reactor is treated at temperatures between 350 and 750° C. The chlorine may be employed in stoichiometric amount or up to about 30 percent excess. Preferably the height of the permeable reaction layer is about 0.5 to 7 cm. and the temperature is about 500 to 700° C. The weight ratio of $V_2O_5$: carbon ranges from about 10:1 up to about 10:1.2. Additional vanadium pentoxide and carbon may be added to the tubular reactor from the top, either periodically or continuously, without exceeding the specified height, thereby rendering the process continuous.

The reactor may be heated as by a heating mantle throughout its entire height above the reaction layer to a temperature above the boiling point of $VOCl_3$, i.e. about 150° C., in order to ensure uncomplicated distillation of the product.

In starting, the reaction layer is heated to about 350–400° C. in an appropriate nitrogen stream, prior to the introduction of chlorine, and then the reaction temperature is regulated without further heating by controlling the rate of supply of reactants. The reactor consists of a nickel or nickel-plated tube coated with a fireproof and chemical-resistant material. The bottom part of the reactor contains apparatus for the introduction and distribution of chlorine, for the introduction of nitrogen as well as a heating apparatus. The top part is provided with apparatus for raw material introduction and distribution, a fitting for temperature measurement, a service opening as well as lines for removal of crude reaction product and waste gas. The inner measurements of the reactor can be as follows, for example Diameter between 100–1000 mm.
Height between 1500–3000 mm.

Vanadium pentoxide containing but few impurities is employed as the raw material; preferably it analyzes at least about 99% $V_2O_5$ since larger amounts of impurities block the reactor after some operating time, interfering with the continuity of the process. It should be powdery or fine-grained with a particle size of about 1 to 2000 microns for the purpose of convenient addition.

The reaction carbon used for the reduction should have a very low ash content and be low in, or preferably free from, sulfur. The carbon is likewise added as powder or fine-grained particles ranging in size from about 500 to 2000 microns. The grain size of the carbon must be adjusted to the particular $V_2O_5$ grain size, so that in no case will a separation of the raw material take place during the material introduction. Petroleum coke and coke from tar or pitch have proven to be very suitable forms of carbon.

The reaction chlorine can be the so-called "cell chlorine," which should be dried.

To ensure the desired layer height in the reactor, only as much raw material per unit time is added as can react in this time. The rate of feed can amount to from about 0.5 kg. in 15 minute intervals in a small diameter reactor up to about 20 kg. in 120 minute intervals in a large diameter reactor. The spreading of raw material in a thin layer is performed without difficulty even in the case of low feed rates in a small diameter reactor. For reactors of larger diameter, the spreading of raw materials into a thin layer is performed by dropping them from a height and by feeding the material in over a short period of time. A rotameter controls the chlorine feed as required.

The invention will be further described in the following illustrative examples.

EXAMPLE 1

A reactor with a diameter of 300 mm. and a height of 1500 mm. is heated, throughout its height, to 150° C. by means of a heating mantle, and a heater in the reactor bottom is brought to 500° C. Nitrogen is conducted through the heated system, after which the reactor is loaded with 3 kg. of a $V_2O_5$-carbon mixture, weight ratio 10:1.1. The grain size distribution of $V_2O_5$ ranges between 1 and 1500 microns, that of the carbon between 1000 and 2000 microns. After the mixture has reached about 400° C., the nitrogen stream is shut off and the introduction of chlorine is begun. The temperature climbs quickly only to about 600° C. and the first vanadium oxytrichloride is condensed in a calibrated receptacle, after fine dust removal. The bottom heating is cut off. Every 15 minutes additional mixed raw materials are added in 0.5 kg. portions, which corresponds to a particular raw material layer thickness of 0.5 cm. The reaction temperature is controlled by the quantities of raw material added and the addition frequency. If the temperature should fall under the normal value of about 350° C., the bottom heater is again turned on.

The condensed raw product is distilled once again and the purity then corresponds to the data given in the literature. The yield is quanitative. The production capacity of the reactor amounts to about 2.5–3.0 tons per month.

Substantially similar results are obtained when the initial charge of reactants ranges as high as 10 kg., when the time between addition of further charges of reactants is lengthened to 30 minutes, and when the charge weight is raised to 1 and 2 kg., corresponding to a layer thickness of 1 or 2 cm.

EXAMPLE 2

In a reactor having a diameter of 600 mm. and a height of 2200 mm., the procedure of Example 1 is followed. Satisfactory results are achieved at raw material feed rates ranging from 7.5 to 12 kg. of $V_2O_5$-carbon mixture added at intervals of about 2 hours. The production capacity of the reactor amounts to about 7 kg./hour.

It will be appreciated that the instant specification and examples are set forth by way of illustration and not limitation, and that various modifications and changes may be made without departing from the spirit and scope of the present invention.

What is claimed is:

1. In the production of vanadium oxytrichloride wherein vanadium pentoxide, carbon and chlorine are reacted, the improvement which comprises effecting the reaction by contacting a mixture of fine-grained vanadium pentoxide and carbon in the form of a gas permeable layer about 0.5 to 20 cm. high with chlorine at a temperature of about 350 to 750° C.

2. Process according to claim 1, wherein the ratio of vanadium pentoxide to carbon is about 10:1–1.2.

3. Process according to claim 1, wherein the vanadium oxytrichloride is withdrawn as a gas above about 150° C. and is thereafter condensed.

4. Process according to claim 1, wherein the height of the layer is about 0.5 to 7 cm. and the reaction temperature is about 500 to 700° C.

5. Process according to claim 1, wherein the process is effected continuously, additional vanadium pentoxide-carbon mixture being supplied to maintain the height of said layer, chlorine being supplied in an amount ranging from about 1 to 1.3 times theoretical.

6. Process according to claim 5, wherein the vanadium pentoxide-carbon layer is heated in a nitrogen stream to about 350 to 400° C. prior to contact with chlorine, chlorine is then introduced and heating is discontinued, the temperature of the exothermic reaction being maintained by controlling the rate of addition of reactants.

7. Process according to claim 6, wherein the height of the layer is about 0.5 to 7 cm., the reaction temperature is about 500 to 700° C., the ratio of vanadium pentoxide to carbon is about 10:1–1.2 and the vanadium oxytrichloride is withdrawn as a gas above about 150° C. and is thereafter condensed.

References Cited

UNITED STATES PATENTS

| | | | |
|---|---|---|---|
| 1,415,028 | 5/1922 | Gildemeister | 23—19 V |
| 1,331,257 | 2/1920 | Heap et al. | 23—17 |
| 1,179,394 | 4/1916 | Barton | 23—17 X |
| 3,355,244 | 11/1967 | Carter et al. | 23—17 |

OTHER REFERENCES

Sheka et al.: "Chemical Abstracts," vol. 68, 1968, Abstract No. 456,595.

HERBERT T. CARTER, Primary Examiner

U.S. Cl. X.R.

423—592